(12) United States Patent
Roberts

(10) Patent No.: US 7,175,007 B2
(45) Date of Patent: Feb. 13, 2007

(54) BACKPLATE AND A METHOD OF MAKING A BACKPLATE

(75) Inventor: Paul Roberts, Newport (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 0 days.

(21) Appl. No.: 10/497,826

(22) PCT Filed: Dec. 5, 2002

(86) PCT No.: PCT/GB02/05508

§ 371 (c)(1),
(2), (4) Date: Sep. 27, 2004

(87) PCT Pub. No.: WO03/048598

PCT Pub. Date: Jun. 12, 2003

(65) Prior Publication Data

US 2005/0034940 A1 Feb. 17, 2005

(30) Foreign Application Priority Data

Dec. 7, 2001 (GB) .................... 0129302.6

(51) Int. Cl.
*F16D 65/04* (2006.01)
(52) U.S. Cl. .............. 188/250 B; 188/250 D
(58) Field of Classification Search .......... 188/250 B, 188/252, 250 D, 250 E
See application file for complete search history.

(56) References Cited

U.S. PATENT DOCUMENTS

| | | | | |
|---|---|---|---|---|
| 3,235,037 A | * | 2/1966 | Peras .................... | 188/250 B |
| 3,275,105 A | * | 9/1966 | Petit ....................... | 188/250 B |
| 3,477,551 A | * | 11/1969 | Beuchle et al. ......... | 188/250 B |
| 3,920,108 A | | 11/1975 | Ely | |
| 4,508,199 A | * | 4/1985 | Herbulot et al. ........ | 188/250 B |
| 4,552,252 A | * | 11/1985 | Stahl ........................ | 188/73.1 |
| 5,117,949 A | * | 6/1992 | Buckley et al. ......... | 188/250 B |
| 5,203,438 A | * | 4/1993 | Ide .......................... | 192/107 C |
| 5,332,067 A | * | 7/1994 | Prud'homme .............. | 188/73.1 |
| 5,355,986 A | | 10/1994 | Biswas | |
| 5,499,705 A | * | 3/1996 | Ide .......................... | 188/250 B |
| 5,617,935 A | * | 4/1997 | Chuang et al. ............ | 188/73.1 |
| 5,743,361 A | * | 4/1998 | Winter .................... | 188/250 G |
| 6,279,222 B1 | * | 8/2001 | Bunker et al. .......... | 188/250 B |
| 6,488,131 B2 | * | 12/2002 | Hayford ................. | 188/250 B |

FOREIGN PATENT DOCUMENTS

| | | |
|---|---|---|
| DE | 19706123 A1 * | 8/1998 |
| EP | 705993 A1 * | 4/1996 |
| GB | 1053437 | 1/1967 |
| GB | 1185176 | 3/1970 |
| GB | 2053390 | 2/1981 |
| GB | 2123908 | 2/1984 |
| JP | 11-082568 A * | 3/1999 |

OTHER PUBLICATIONS

Computer translation of 11-082568.*

\* cited by examiner

*Primary Examiner*—Robert A. Siconolfi
(74) *Attorney, Agent, or Firm*—Carlson, Gaskey & Olds

(57) ABSTRACT

A backplate supports friction material of a disc brake pad. The backplate includes a substantially planar portion of sheet metal and a stiffening flange extending around at least a portion of the periphery of the planar portion.

15 Claims, 2 Drawing Sheets

BACKPLATE AND A METHOD OF MAKING A BACKPLATE

REFERENCE TO RELATED APPLICATIONS

This application is a National Stage Application of PCT Application PCT/GB02/05508 filed on Dec. 5, 2002, which claims priority to Great Britain Patent Application GB 0129302.6 filed on Dec. 7, 2001.

TECHNICAL FIELD

The present invention relates to a backplate and a method of making a backplate. More specifically, the present invention relates to a backplate and a method of making a backplate for supporting friction material of a disc brake pad, in particular, but not exclusively, for use on heavy vehicles, such as trucks.

BACKGROUND OF THE INVENTION

Backplates of vehicle disc brake pads essentially perform two functions. For one, they provide a solid support for slidably mounting friction material within a brake carrier in such manner to transmit shear loads induced on the friction material during braking to the brake carrier. Additionally, they transmit and distribute the pressure applied by brake tappets during braking evenly to the surface of the friction material to ensure even wear of the friction material over its service life.

In order to perform the first of these two functions, it is common to employ a resilient member, such as a leaf-type spring, to hold the brake pad radially in the brake carrier while permitting movement toward and away from an associated brake disc to prevent rattling of the brake pad in use. A positive location feature is usually provided on the backplate to ensure that the friction material is securely attached to the backplate. For example, the positive location feature can be holes or recesses into which the friction material can extend or steel mesh welded on to the backplate around which the friction material may be formed.

Each brake is generally provided with one or more tappets that apply the braking force over a small area relative to the total area of the backplate. To distribute the pressure from the brake tappet(s), it has previously been necessary to provide a relatively thick solid steel backplate that is punched or otherwise cut from steel sheet and is resistant to bending. Alternatively, an intermediate spreader plate has been employed to distribute the load over a thinner, although still substantial, backplate. A thick backplate constitutes a substantial proportion of the overall mass of the brake pad when unworn (e. g., approximately 30%). Once the friction material wears away in use, the backplate is usually thrown away. Reducing the mass of the backplate will result in environmental benefits and a reduction in the cost of materials. A lower backplate mass additionally means that a lower strength, and therefore lower mass (and a potentially lower cost) pad spring may be sufficient to hold the backplate in place.

A further disadvantage of prior art backplates for heavy vehicles is that high capacity stamping machines are required to manufacture the backplates, and consequentially a high capital investment is required to set up a manufacturing plant.

The present invention seeks to overcome, or at least mitigate, the problems of the prior art.

SUMMARY OF THE INVENTION

One aspect of the present invention is a backplate for supporting friction material of a disc brake pad, the backplate including a substantially planar portion of sheet metal and a stiffening flange extending around the entire periphery of the planar portion. The substantially planar portion has a first face, which is configured to receive the friction material, and a second face. The stiffening flange extends from the second face away from the first face.

A second aspect of the present invention is a backplate for supporting friction material of a disc brake pad. The backplate includes a substantially planar portion of sheet metal and a stiffening flange extending around at least a portion of the periphery of the planar portion. The backplate further includes a boss arranged to be capable of transmitting a load induced by a brake actuator to the friction material.

A third aspect of the present invention is a backplate for supporting friction material of a disc brake pad. The backplate includes a flange that extends around at least a portion of a periphery of the backplate. The backplate is provided with a spring integral with the flange and arranged to resiliently resist movement in a direction in a plane as defined by the backplate during use.

A fourth aspect of the present invention is a backplate for supporting friction material of a brake pad for use in a heavy vehicle disc brake, the backplate including sheet metal having a thickness between 1 mm to 3 mm. A stiffening feature is provided in the backplate to impart sufficient strength.

The present invention also is directed to a method of making a backplate for supporting friction material of a disc brake pad. The method includes the steps of cutting a blank from a metal sheet, and) drawing the blank in a press to form a backplate having a substantially planar portion with a first face configured to receive the friction material, a second face, and a stiffening flange extending around the entire periphery of the planar portion from the second face away from the first face. The method also includes the step of securing the friction material to the first face of the planar portion.

BRIEF DESCRIPTION OF THE DRAWINGS

Embodiments of the present invention will be described, by way of example only, with reference to the accompanying drawings in which.

DETAILED DESCRIPTION OF THE PREFERRED EMBODIMENT

Figure 1:
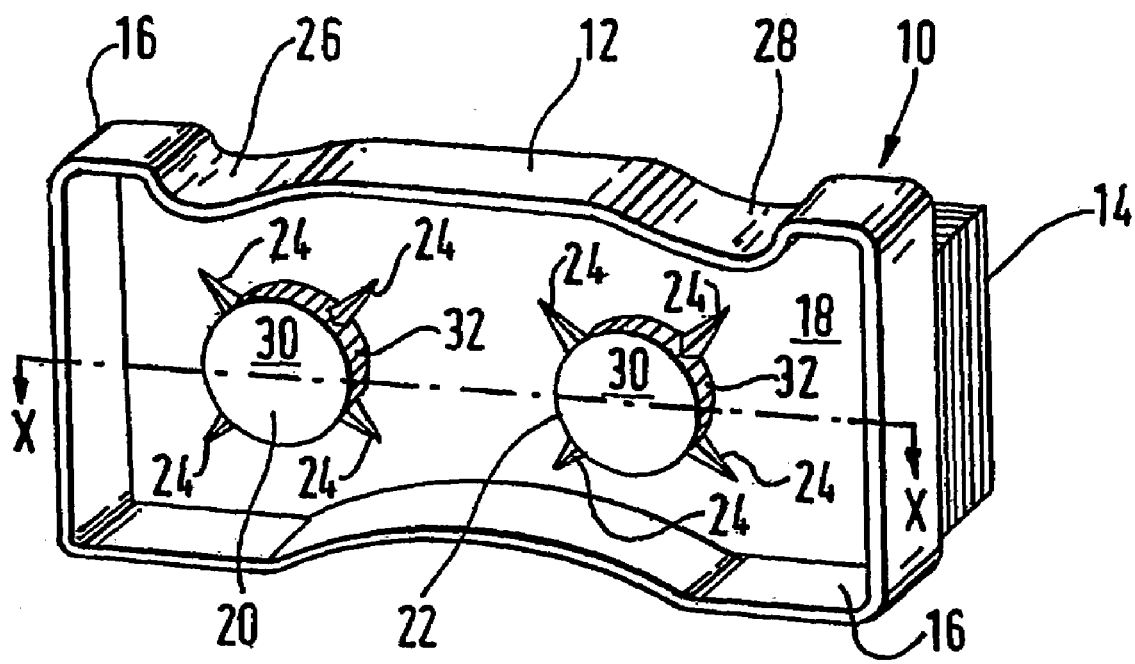
FIG. 1 is a perspective view of a rear face of a disc brake pad incorporating a backplate according to one embodiment of the present invention.
Figure 2:
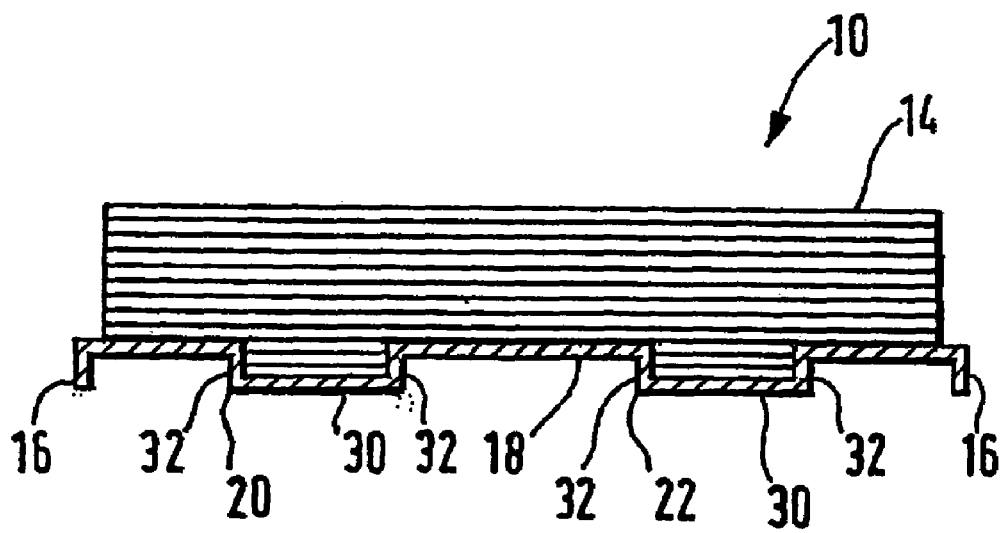
FIG. 2 is a cross-sectional view of line X—X of FIG. 1.

Referring to FIGS. 1 and 2, a disc brake pad 10 includes a steel backplate 12 and sacrificial friction material 14. The friction material 14 may be of any suitable known type and does not form part of the invention. The backplate 12 is formed of relatively thin sheet metal material, typically sheet steel. The backplate 12 according to the present invention for use with heavy vehicles is formed from sheet steel having a thickness of between approximately 1 mm and 3 mm, preferably approximately 2 mm. This contrasts with prior art backplates, which generally have a thickness of 8 mm to 9 mm.

The backplate 12 includes a substantially planar body portion 18 and a peripheral flange 16 arranged substantially 90° with respect to the body portion 18 and extending away from the friction material 14.

In one embodiment, the backplate 12 is further provided with a pair of raised bosses 20 and 22 positioned to be contacted by tappets (not shown) of an actuating portion of the disc brake, thereby urging the friction material 14 into contact with a brake disc (not shown) to cause braking. The bosses 20 and 22 are substantially circular in shape and include two raised tappet contacting faces 30 that are substantially parallel to the plane of the body portion 18 and interconnected to the body portion 18 by skirt portions 32. In this embodiment, the skirt portions 32 are substantially perpendicular to the planes of the body portion 18 and to the raised tapped contacting faces 30. In another embodiment, the skirt portions 32 may be angled relative to the body portion 18 and to the raised tappet contacting faces 30.

The number of bosses 20 and 22 may be adjusted according to the number of tappets provided on the brake actuating portion, or a single projection may be provided for two or more tappets. The shape and depth of the bosses 20 and 22 may also be adjusted as required. One skilled in the art would appreciate that the bosses 20 and 22 stiffen the backplate 12 and distribute the load applied by the brake tappet(s) more evenly over the friction material 14, thereby reducing the tendency of the backplate 12 and the friction material 14 to bend. The bosses 20 and 22 advantageously assist in the positive location of the friction material 14 to the backplate 12, thus reducing the risk of the friction material 14 detaching under shear loads.

Preferably, radially outwardly extending ribs 24 may be formed around the base circumference of the bosses 20 and 22 to further enhance the load spreading characteristics of the bosses 20 and 22. As shown in FIG. 1, four outwardly extending ribs 24 are provided for each of the bosses 20 and 22, but this number may be adjusted according to the particular requirements and characteristics of the backplate 12.

The upper portion of the flange 16 is provided with a pair of recesses 26 and 28 that are shaped to locate an appropriately dimensioned pad spring (not shown). The shape of the recesses 26 and 28 may be altered to accommodate various shapes of the pad spring.

The backplate 12 is preferably manufactured from a blank of relatively thin sheet steel that is formed in a press between appropriately contoured dies to form the peripheral flange 16 and/or the bosses 20 and 22. The backplate 12 is preferably cold formed, although hot forming is also possible. Some localized thinning of the material may occur during pressing, but this is largely restricted to the corners where the flanges 16 formed on the radial edges and circumferential edges intersect and to the areas of the bosses 20 and 22.

Figure 3:
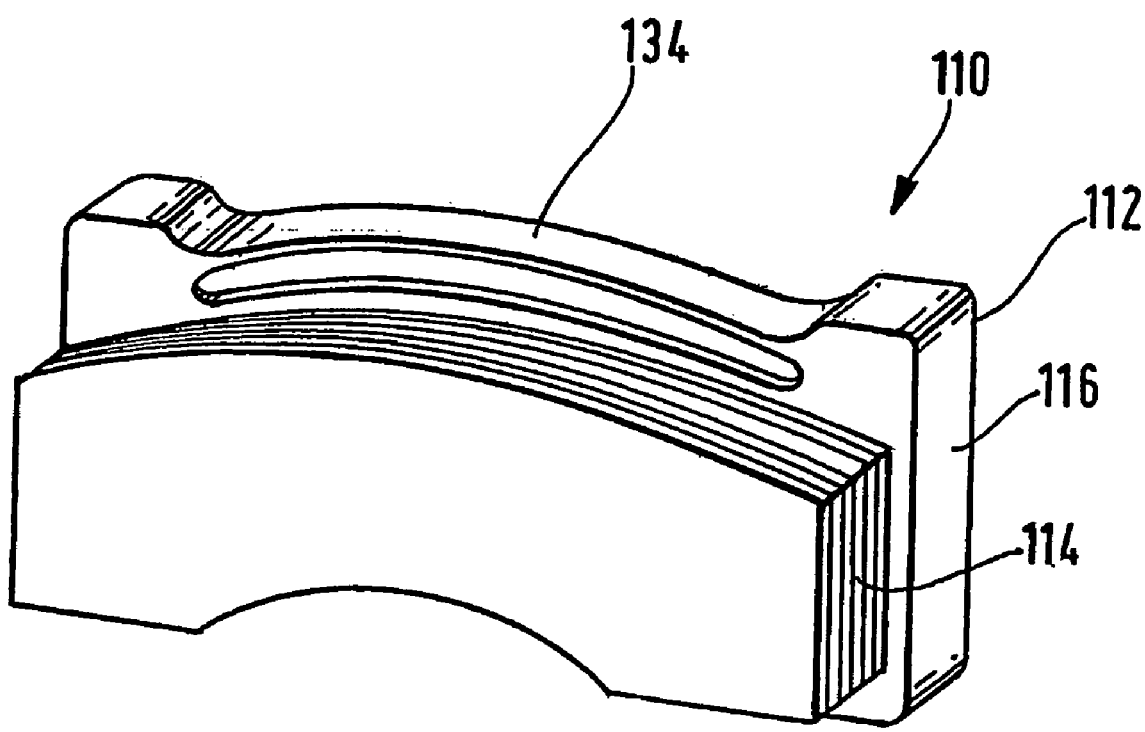
FIG. 3 is a perspective view of the front of a disc brake pad according to second embodiment of the present invention.

FIG. 3 illustrates an alternative embodiment of the disc brake pad 110 in which like numerals have, where possible, been used to designate like parts, with the addition of the prefix "1". In this embodiment, a pad spring 134 is formed integrally with the backplate 112, again preferably using the press forming process described above. One advantage of providing an integral pad spring 134 is that a separate spring component does not need to be manufactured, possible providing additional cost and weight savings.

It should be understood that numerous changes may be made within the scope of the present invention. For example, the backplate 12 may be manufactured from materials other than steel, such as aluminum, provided the materials have appropriate strength and drawing characteristics. Alternative manufacturing methods may be employed, such as drop forging, fabrication, or die casting. Stiffening features other than a flange 16 may be provided in the backplate 12, and the flange 16 may not necessarily extend around the entire periphery of the backplate 12. For example, a flange 16 may only be provided on one or more of the radial or circumferential edges of the backplate 12. The backplate 12 may be used in relation to disc brake pads 10 intended for fitment to other vehicles, such as cars and the like.

An integral pad spring 134 may also be provided in backplates 112 manufactured using alternative methods to the drawing methods described above. The volume defined by the peripheral flange 116 may be at least partially filled with insulating material to inhibit the transfer of friction induced heat to the brake tappet(s), whose seals may otherwise be damaged by such high temperatures.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A disc brake pad comprising:
   a friction material; and
   a backplate for supporting the friction material, the backplate including:
   a substantially planar portion of sheet metal including a face to which the friction material is secured; and
   a stiffening flange extending around an entire peripheral edge of the substantially planar portion of sheet metal and away from the face, wherein the stiffening flange is disposed substantially perpendicular to the substantially planar portion of sheet metal, and the stiffening flange includes a recess that mounts a pad spring.

2. The disc brake pad according to claim 1 wherein the backplate includes a radially inner circumferential edge and a radially outer circumferential edge, wherein the stiffening flange is provided on at least one of the radially inner circumferential edge and the outer radially circumferential edge.

3. The disc brake pad according to claim 1 wherein the stiffening flange is press formed.

4. The disc brake pad according to claim 1 wherein the substantially planar portion of sheet metal has a thickness between 1 and 3 mm.

5. The disc brake pad according to claim 1 wherein the backplate is press formed.

6. The disc brake pad according to claim 1 wherein the backplate further includes a boss having a recessed hollow portion extending away from the face, and the boss is arranged to transmit a load induced by a brake actuator to the friction material.

7. A disc brake pad for use in a heavy vehicle disc brake comprising:
  a friction material; and
  a backplate for supporting the friction material, the backplate including:
    a substantially planar portion of sheet metal including a face that supports the friction material;
    a stiffening flange extending around an entire peripheral edge of the substantially planar portion of sheet metal, wherein the stiffening flange extends away from the face; and
    a boss including a recessed hollow portion extending away from the face, wherein the boss is arranged to transmit a load induced by a brake actuator to the friction material, and the boss includes a stiffening rib extending from the face.

8. The disc brake pad according to claim 7 wherein the boss is press formed.

9. The disc brake pad according to claim 7 wherein the stiffening rib extends radially from the face.

10. A backplate for supporting a friction material of a disc brake pad, the backplate comprising:
  a peripheral stiffening flange; and
  an integral spring integrally formed with the peripheral stiffening flange and arranged to resiliently resist movement in a direction substantially in a plane defined by the backplate.

11. The backplate according to claim 10 wherein the integral spring is press formed.

12. The backplate according to claim 10 further comprising a press formed boss arranged to transmit a load induced by a brake actuator to the friction material.

13. The backplate according to claim 10 further including a radially outer edge, wherein the integral spring is proximate to the radially outer edge to resiliently resist radially outward movements of the disc brake pad in the direction substantially in the plane defined by the backplate.

14. A disc brake pad comprising:
  a friction material; and
  a backplate for supporting the friction material the backplate including:
    a substantially planar portion of sheet metal including a face to which the friction material is secured; and
    a stiffening flange extending around an entire peripheral edge of the substantially planar portion of sheet metal and away from the face, wherein the stiffening flange is disposed substantially perpendicular to the substantially planar portion of sheet metal, and
    a boss having a recessed hollow portion extending away from the face, wherein the boss is arranged to transmit a load induced by a brake actuator to the friction material, and the boss includes a stiffening rib extending from the face.

15. The disc brake pad according to claim 14 wherein the stiffening rib extends radially from the face.

* * * * *